(12) United States Patent
Mori

(10) Patent No.: US 7,281,427 B2
(45) Date of Patent: Oct. 16, 2007

(54) ACCELERATION SENSOR

(75) Inventor: Hironari Mori, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 145 days.

(21) Appl. No.: 11/254,822

(22) Filed: Oct. 21, 2005

(65) Prior Publication Data

US 2006/0130581 A1 Jun. 22, 2006

(30) Foreign Application Priority Data

Dec. 22, 2004 (JP) .............................. 2004-372370

(51) Int. Cl.
*G01P 15/12* (2006.01)
(52) U.S. Cl. ....................................... 73/514.33; 338/2
(58) Field of Classification Search ............. 73/514.33; 338/2
See application file for complete search history.

(56) References Cited

U.S. PATENT DOCUMENTS 6,763,719 B2 * 7/2004 Hatano et al. ........... 73/514.33

FOREIGN PATENT DOCUMENTS

JP        2003-279592        10/2003

* cited by examiner

*Primary Examiner*—John E. Chapman
(74) *Attorney, Agent, or Firm*—Rabin & Berdo, P.C.

(57) ABSTRACT

The piezo-resistance type triaxial acceleration sensor includes a frame section, a mass section disposed in the frame section, beam elements which flexibly support the mass section, and piezo-resistors for the X, Y and Z axes formed on the beam elements. The length of the Z-axis piezo-resistors is longer than the length of the X-axis piezo-resistors and the Y-axis piezo-resistors, so as to decrease the sensitivity.

14 Claims, 4 Drawing Sheets

ACCELERATION SENSOR

BACKGROUND OF THE INVENTION

1. Field of the Invention

The present invention relates to a piezo-resistance type triaxial acceleration sensor used for portable terminal equipment and other similar small devices for detecting acceleration in three axis directions (X, Y and Z axis directions), and more particularly to a technology for reducing the output difference among the three axes (X, Y and Z axes) so as to save power.

2. Description of the Related Art

Conventional technology on an acceleration sensor for decreasing the output difference among the three axes (X, Y and Z axes) is, for example, disclosed in Japanese Patent Application Kokai (Application Laid-Open) No. 2003-279592.

FIG. 4A and FIG. 4B of the accompanying drawings depict the conventional piezo-resistance type triaxial acceleration sensor disclosed in Japanese Patent Application Kokai No. 2003-279592. FIG. 4A is a plan view and FIG. 4B is a cross-sectional view taken along the line 4B-4B in FIG. 4A.

This acceleration sensor is made from a silicon monocrystal substrate, and has a square frame section 1. At each of the four corners inside the frame section 1, an opening 2 penetrates through in the Z axis direction, that is the vertical direction to the FIG. 4A drawing sheet, and at the inner center of these four openings 2, a mass section 3, which is a thick weight, is disposed. The mass section 3 is flexibly connected to the frame section 1 by the thin beam section 4. The beam section 4 includes two X-direction beam elements 4-1a and 4-1b extending in the X axis direction, which is the width direction of the FIG. 4A drawing sheet, and two Y-direction beam elements 4-2a and 4-2b extending in the Y axis direction, which is in the height direction of the FIG. 4A drawing sheet. These four beam elements 4-1a, 4-1b, 4-2a and 4-2b supports the mass section 3 at the center of the acceleration sensor such that the mass section 3 can move to a certain extent in the X, Y and Z directions.

On the X-direction beam elements 4-1a and 4-1b, two pairs of X-axis piezo-resistors 5-1a and 5-1b and 5-2a and 5-2b are formed, and also two pairs of Z-axis piezo-resistors 5-5a and 5-5b and 5-6a and 5-6b are formed. Likewise, on the Y-direction beam elements 4-2a and 4-2b, two pairs of Y-axis piezo-resistors 5-3a and 5-3b and 5-4a and 5-4b are formed. Each piezo-resistor 5-1a and 5-1b to 5-6a and 5-6b has the same shape (same length) with the same resistance value.

The acceleration detection principle is briefly described here. The deflections of the beam elements 4-1a, 4-1b, 4-2a and 4-2b, when the mass section 3 displaces upon receiving a force in proportion to the acceleration, are detected as the resistance change of the piezo-resistor pairs formed on the beam elements 5-1a and 5-1b, 5-2a and 5-2b, 5-3a and 5-3b, 5-4a and 5-4b, 5-5a and 5-5b and 5-6a and 5-6b, so as to detect the acceleration in the three axis directions. The two pairs of the piezo-resistors 5-1a and 5-1b and 5-2a and 5-2b on the beam elements 4-1a and 4-1b detect acceleration in the X axis direction, the two pairs of the piezo-resistors 5-5a and 5-5b and 5-6a and 5-6b on the beam elements 4-1a and 4-1b detect the acceleration in the Z axis direction, and the two pairs of the piezo-resistors 5-3a and 5-3 b and 5-4a and 5-4b on the beam elements 4-2a and 4-2b detect the acceleration in the Y axis direction. For such acceleration detection, each four piezo-resistors (two pairs of piezo-resistors) of each axis are wired to construct a bridge circuit independently.

The relationship between the positions of the piezo-resistors and the sensor output in each X, Y and Z axis will now be described. As an example, the X-axis piezo-resistors 5-1a and 5-1b and the Z-axis piezo-resistors 5-5a and 5-5b formed on the beam element 4-1a are used.

Although this is different from FIG. 4A, it is assumed that the X-axis piezo-resistor 5-1a and the Z-axis piezo-resistor 5-5a are positioned contacting the boundary line P1 with the frame section 1, and the X-axis piezo-resistor 5-1b and the Z-axis piezo-resistor 5-5b are positioned contacting the boundary-line P2 with the mass section 3. In this case, stress concentrates on the area around the frame section 1 and the mass section 3 in this beam element 4-1a when the beam element 4-1a deflects by the acceleration received, so the maximum sensor output can be obtained. The sensitivity characteristic (output with respect to angular velocity 1 G and drive voltage 1V) differs between the X axis and the Y axis. The sensitivity in the X axis changes quadratic-functionally, and the sensitivity in the Z axis changes linear-functionally.

In other words, if an acceleration of 1 G is applied in the X axis direction, the bending moment to be applied to the beam element 4-1a is given by the product (s1×m) of the distance s1, from the plane which passes through the beam elements 4-1a, 4-1b, 4-2a and 4-2b to the center of gravity of the mass section 3, and the mass m of the mass section 3. Therefore if the thickness of the mass section 3 changes, the bending moment is in proportion to s1 and m and the sensitivity of the X axis changes quadratic-functionally. On the other hand, if an acceleration of 1 G is applied in the Z axis direction, the bending moment to be applied to the beam element 4-1a is given by the product (s2×m) of the length s2 of the beam element 4-1a and the mass m of the mass section 3. Therefore if the thickness of the mass section 3 changes, the bending moment is in proportion only to m, and the sensitivity of the Z axis changes linear-functionally.

To eliminate the output difference between the X axis and the Y axis, the thickness of the mass section 3 should be set to a value at the intersection of the quadratic function curve, which indicates the sensitivity of the X axis, and the linear function curve, which indicates the sensitivity of the Y axis (e.g. about 800 µm). However the thickness of the silicon mono-crystal substrate used for semiconductors is mostly 625 µm or 525 µm, so a silicon mono-crystal substrate with about an 800 µm thickness requires special ordering, which increases cost. In other words it is not preferable to adjust the output by the thickness of the mass section 3.

If a silicon mono-crystal substrate with a 625 µm or 525 µm thickness, which can be easily acquired, is used, the linear function curve of the Z axis comes above the quadratic function curve of the X axis, i.e., the output of the Z axis becomes higher than the output of the X axis. If such an output difference is generated, the detection sensitivity of the sensor drops. In order to decrease this output difference, an amplifier with a different output amplification factor must be provided for each axis. This increases cost.

To solve these shortcomings, Japanese Patent Application Kokai No. 2003-279592 teaches the following structure. The boundary line P1 with the frame section 1 and the boundary line P2 with the mass section 3 are locations where stress concentrates in the beam element 4-1a. The X-axis piezo-resistor 5-1a is disposed at a position contacting the boundary line P1 and the X-axis piezo-resistor 5-1b is disposed at a position contacting the boundary line P2. Also, the distance between the Z-axis piezo-resistors 5-5a and 5-5b is spread as shown in FIG. 4A, or is narrowed (not shown in FIG. 4A), so that the Z-axis piezo-resistors 5-5a and 5-5b are disposed at positions where less influence of the stress-concentrated area is received, and as a result the sensitivity of the Z-axis piezo-resistors 5-5a and 5-5b is decreased and the output difference between the X axis and the Z axis is decreased.

SUMMARY OF THE INVENTION

In the case of the acceleration sensor of Japanese Patent Kokai No. 2003-279592, the output difference among the X, Y and Z axes is reduced by spreading or narrowing the distance between the same shaped Z-axis piezo-resistors 5-5a and 5-5b, so a complicated distortion calculation is required to determine the positions of the Z-axis piezo-resistors 5-5a and 5-5b, which is a disadvantage. When the acceleration sensor is mounted on a portable terminal equipment and is driven by battery, it is preferable that the power consumption of the angular velocity sensor is smaller, but in Japanese Patent Kokai No. 2003-279592, this kind of power saving is not considered, and a technically satisfactory angular velocity sensor has not yet been implemented.

According to a first aspect of the present invention, there is provided an acceleration sensor that includes a frame section, a mass section disposed inside the frame section, and a beam section. The beam section has X-direction beam elements and Y-direction beam elements. The beam section flexibly connects the mass section to the frame section by the X-direction beam elements and the Y-direction beam elements. The acceleration sensor also includes a plurality of X-axis piezo-resistor pairs. Each X-axis piezo-resistor pair is associated with each X-direction beam element. This X-axis piezo-resistor pair has a first X-axis piezo-resistor with the length L1 disposed contacting one end of the associated X-direction beam element, and a second X-axis piezo-resistor with the length L1 disposed contacting the other end of the associated X-direction beam element. The acceleration sensor also includes a plurality of Y-axis piezo-resistor pairs. Each Y-axis piezo-resistor pair is associated with each Y-direction beam element. Each Y-axis piezo-resistor pair has a first Y-axis piezo-resistor with the length L1 disposed contacting one end of the associated Y-direction beam element and a second Y-axis piezo-resistor with the length L1 disposed contacting the other end of the associated Y-direction beam element. The acceleration sensor also includes a plurality of Z-axis piezo-resistor pairs. Each Z-axis piezo-resistor pair is associated with each X-axis piezo-resistor pair. Each Z-axis piezo-resistor pair has a first Z-axis piezo-resistor with the length L2 disposed in the vicinity of the first X-axis piezo-resistor of the associated X-axis piezo-resistor pair, and a second Z-axis piezo-resistor with the length L2 disposed in the vicinity of the second X-axis piezo-resistor of the associated X-axis piezo-resistor pair. The length L2 of the first and second Z-axis piezo-resistors is longer than the length L1.

The first Z-axis piezo-resistor with the length L2 may extend in exactly the same area as the first X-axis piezo-resistor, and further extend to an area of smaller-distortion so as to be longer than the first X-axis piezo-resistor. The second Z-axis piezo-resistor with the length L2 may also extend in exactly the same area as the second X-axis piezo-resistor, and further extend to an area of smaller-distortion area so as to be longer than the second X-axis piezo-resistor.

The first and second Z-axis piezo-resistors may only extend in the associated X-direction beam element. Alternatively, the first and second Z-axis piezo-resistors may extend in the associated X-direction beam element and the frame section. The thickness of the substrate is for example 625 μm or 525 μm.

According to the present invention, the length L2 of each Z-axis piezo-resistor is longer than the length L1 of the X-axis piezo-resistor. The length L1 area is the largest distortion area. Thus, the Z-axis piezo-resistor inevitably includes a smaller-distortion area, and its sensitivity naturally drops. Accordingly, the output difference between the X axis and the Z axis can be easily decreased. Also the length L2 of each Z-axis piezo-resistor is longer than the length L1 of each X-axis piezo-resistor, so that the resistance of the Z-axis piezo-resistor is higher than that of the X-axis piezo-resistor. Therefore, when a constant voltage is applied to the acceleration sensor for driving, the current that flows through the Z-axis piezo-resistors decreases and power can be saved in the Z-axis piezo-resistors. This contributes to power saving of the entire acceleration sensor.

When the length L2 of the Z-axis piezo-resistors is a simple extension of the length L1, i.e., when the length L2 includes the length L1 entirely, and is longer than the length L1, the determination of the length L2 becomes easier because the value of the length L1 is usually already known. The calculation of the length L2 which includes the length L1 is easy.

These and other objects, aspects and advantages of the present invention will become apparent to those skilled in the art from the following detailed description and appended claims when read and understood in conjunction with the accompanying drawings.

DETAILED DESCRIPTION OF THE INVENTION

Embodiment 1

Figure 1A:
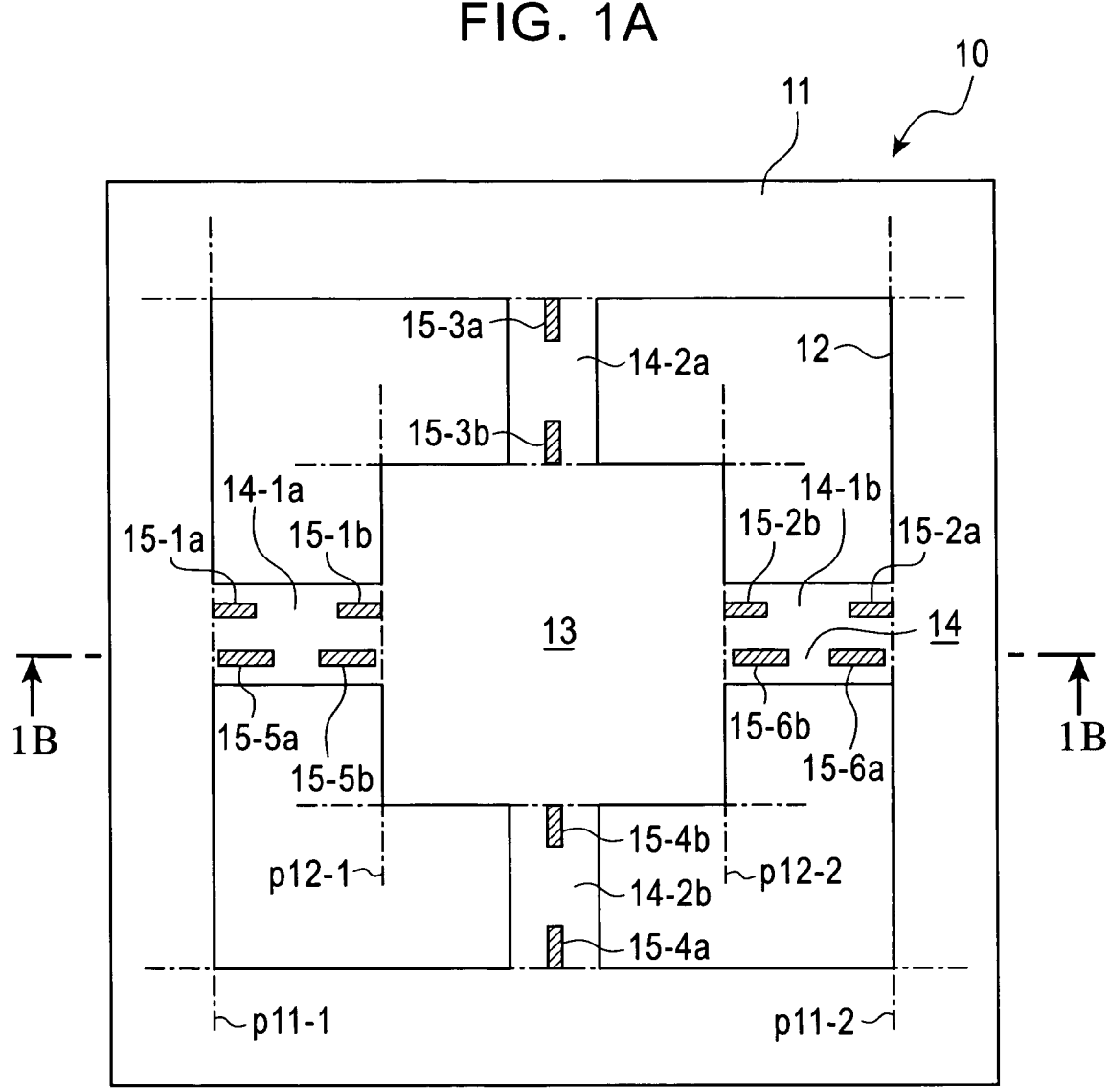
FIG. 1A is a plan view depicting a general configuration of the piezo-resistance type triaxial acceleration sensor according to a first embodiment of the present invention.
Figure 1B:
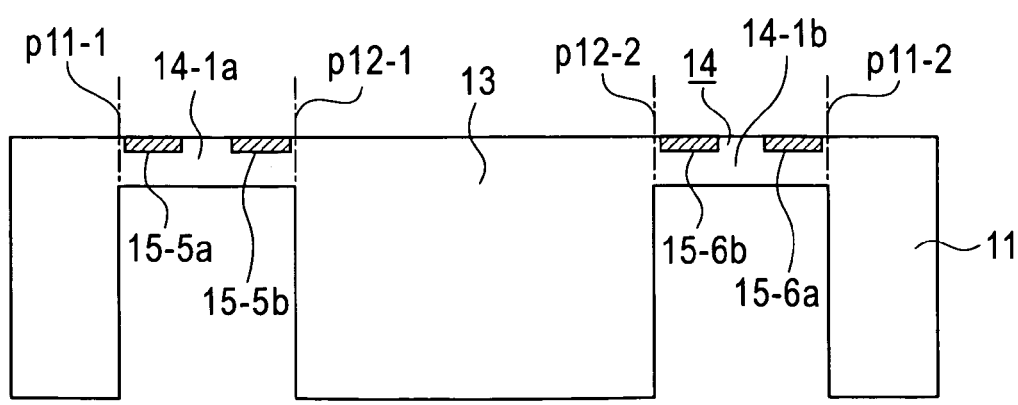
FIG. 1B is a cross-sectional view taken along the 1B-1B line in FIG. 1A.

Referring to FIG. 1A and FIG. 1B, the configuration of the piezo-resistance type triaxial acceleration sensor 10 according to a first embodiment of the present invention will be described.

This acceleration sensor 10 is made from a silicon mono-crystal substrate, just like a prior art, and has roughly a square frame section 11. At the four corners inside the frame section 11, roughly L-shaped openings 12 are formed penetrating in the Z axis direction, that is a vertical direction to the FIG. 1A drawing sheet. At the inner center of the four openings 12, a cubic mass section 13, which is a thick weight, is disposed. The mass section 13 is flexibly connected to the frame section 11 by the thin beam section 14. The beam section 14 includes two rectangular beam elements 14-1a and 14-1b extending in the X axis direction, which is the width direction of the FIG. 1A drawing sheet, and two rectangular beam elements 14-2a and 14-2b extending in the Y axis direction, which is the height direction of the FIG. 1A drawing sheet. These four beam elements 14-1a, 14-1b, 14-2a and 14-2b support the mass section 13 at the center of the acceleration sensor 10 such that the mass section can move to a certain extent in the X, Y and Z directions.

On the X-direction beam sections 14-1a and 14-1b, two pairs of X-axis piezo-resistors 15-1a and 15-1b and 15-2a and 15-2b are formed, and two pairs of Z-axis piezo-resistors 15-5a and 15-5b and 15-6a and 15-6b are formed. On the Y-direction beam sections 14-2a and 14-2b, two pairs of Y-axis piezo-resistors 15-3a and 15-3b and 15-4a and 15-4b are formed.

The piezo-resistors 15-1a, 15-1b to 15-6a, 15-6b have a predetermined thickness and has a plan view of a rectangle with approximately the same width. Each X-axis piezo-resistor 15-1a, 15-1b, 15-2a and 15-2b, and each Y-axis piezo-resistor 15-3a, 15-3b, 15-4a and 15-4b has the same length L1 (e.g. about 50 μm), and has approximately the same resistance value. The length L2 of the Z-axis piezo-resistor 15-5a, 15-5b, 15-6a and 15-6b is longer than the length L1 of the X-axis piezo-resistor (or the length L1 of the Y-axis piezo-resistor). The length L2 is, for example 60 to 70 μm. The Z-axis piezo-resistor has a larger resistance value than the X-axis piezo-resistor.

The acceleration detection principle of this sensor 10 is the same as the prior art. The deflections of the beam elements 14-1a, 14-1b and 14-2a and 14-2b, when the mass section 13 is displaced upon receiving force in proportion to the acceleration, are detected as the change of the resistance values of the piezo-resistor pairs 15-1a and 15-1b, 15-2a and 15-2b, 15-3a and 15-3b, 15-4a and 15-4b, 15-5a and 15-5b, and 15-6a and 15-6b, so as to detect the acceleration in the three axes directions. The four piezo-resistors (two pairs of piezo-resistors) for each axis are wired to form a bridge circuit independently so that the two pairs of piezo-resistors 15-1a and 15-1b, and 15-2a and 15-2b on the beam elements 14-1a and 14-1b detect the acceleration in the X axis direction, and the two pairs of the piezo-resistors 15-5a and 15-5b, 15-6a and 15-6b on the beam elements 14-1a and 14-1b detect the acceleration in the Z axis direction, and the two pairs of the piezo-resistors 15-3a and 15-3b and 15-4a and 15-4b on the beam elements 14-2a and 14-2b detect the acceleration in the Y axis direction.

The output detection principle, the wiring method and the positions of the piezo-resistors in the X axis and the Y axis are the same, and mutual replacement is possible. In the following description, therefore, the X and Y axes are written as the X axis, unless specified otherwise.

The acceleration sensor 10 in FIG. 1A is manufactured as follows, for example.

A mask pattern is formed on the silicon mono-crystal substrate by a photolithography technology, and ions, such as boron, are implanted using this mask pattern as a mask, so that the piezo-resistors 15-1a, 15-1b to 15-6a, 15-6b are formed at predetermined positions in predetermined shapes. On the entire surface of the substrate, an insulation film is formed for protecting the piezo-resistors 15-1a, 15-1b to 15-6a, 15-6b. After opening contact holes in this insulation film, an inter-connect film is formed thereon. Then, the piezo-resistors 15-1a, 15-1b to 15-6a, 15-6b are wired so as to form a bridge circuit independently for each of the three axes. The back face of the silicon mono-crystal substrate is etched by a photolithography technology, so that the back face of the beam section 14 is partly thinned to form isolated beam elements 14-1a, 14-1b, 14-2a and 14-2b, and openings 12. The acceleration sensor is cut out from the silicon mono-crystal substrate to acquire the acceleration sensor chip. The manufacturing process ends with mounting this chip on a package.

Figure 2A:
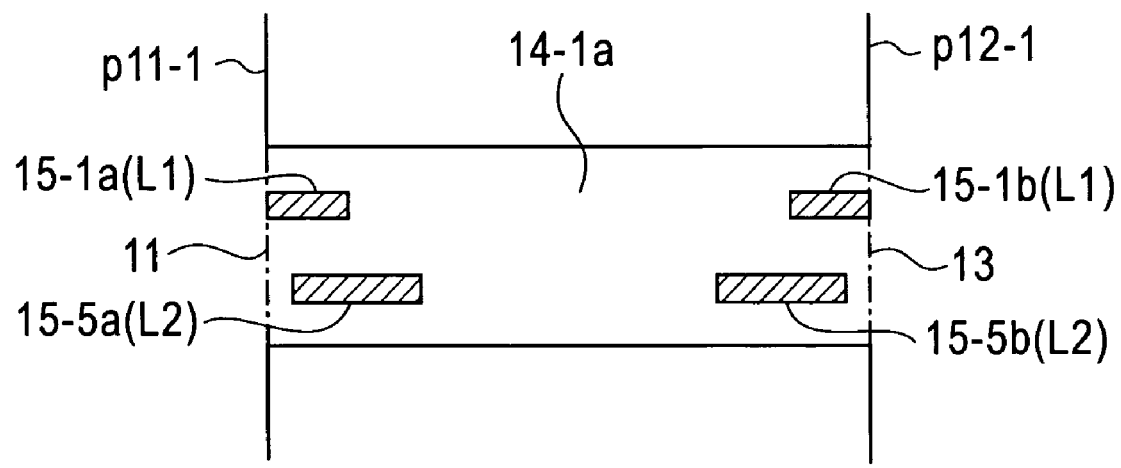
FIG. 2A is an enlarged plan view depicting positions and shapes of the piezo-resistors in FIG. 1A.
Figure 2B:
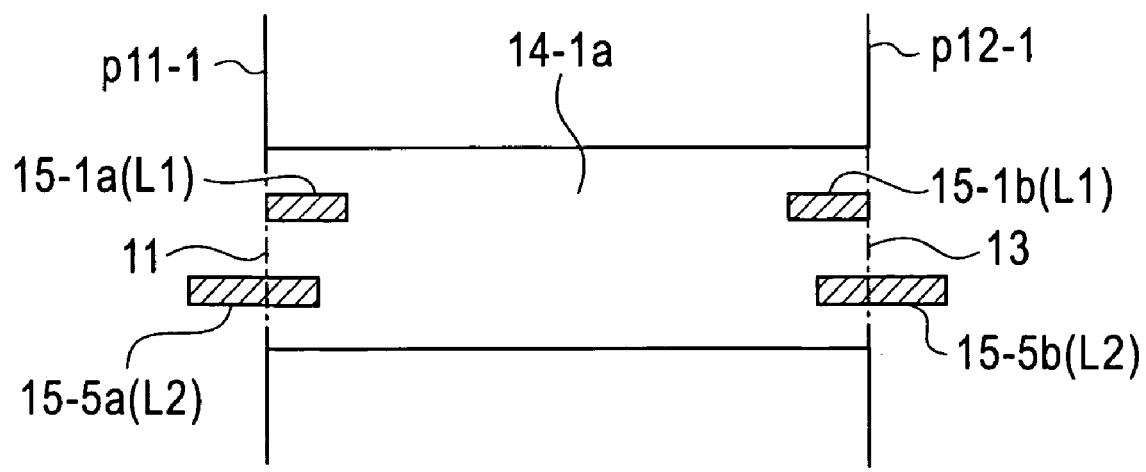
FIG. 2B is similar to FIG. 2A and depicts another positions and shapes of the piezo-resistors according to the present invention.

FIG. 2A and FIG. 2B are enlarged plan views depicting examples of the formation locations and the shapes (particularly the lengths L1 and L2) of the piezo-resistors 15-1a, 15-1b to 15-6a, 15-6b which are formed on the beam elements 14-1a, 14-1b, 14-2a and 14-2b shown in FIG. 1A. In FIG. 2A and FIG. 2B, only the beam element 14-1a is shown to simplify the illustration.

The present embodiment is characterized in that the length L2 of the Z-axis piezo-resistors 15-5a, 15-5b, 15-6a and 15-6b is longer than the length L1 of the X-axis piezo-resistors 15-1a, 15-1b, 15-2a and 15-2b to decrease the sensitivity of the Z-axis piezo-resistors. In Embodiment 1, the formation location of each Z-axis piezo-resistor 15-5a, 15-5b, 15-6a and 15-6b is not specified, and each Z-axis piezo-resistor 15-5a, 15-5b, 15-6a and 15-6b, of which length is longer than the length L1 of each X-axis piezo-resistor 15-1a, 15-1b, 15-2a and 15-2b, is formed to drop the sensitivity.

In both FIG. 2A and FIG. 2B, the X-axis piezo-resistor 15-1a (15-2a), out of the X-axis piezo-resistors 15-1a and 15-1b (15-2a and 15-2b), is formed at a position contacting the boundary line P11-1 (P11-2) with the frame section 11, and the X-axis piezo-resistor 15-1b (15-2b) is formed at a position contacting the boundary line P12-1 (P12-2) with the weight section 13.

In FIG. 2A, the spacing between the Z-axis piezo-resistors 15-5a and 15-5b (15-6a and 15-6b) is decreased as compared with the spacing between the X-axis piezo-resistors 15-1a and 15-1b (15-2a and 15-2b). The Z-axis piezo-resistors 15-5a and 15-5b (15-6a and 15-6b) are formed at the inner side of the X-axis piezo-resistors 15-1a and 15-1b (15-2a and 15-2b).

In FIG. 2B, on the other hand, the distance between the Z-axis piezo-resistors 15-5a and 15-5b (15-6a and 15-6b) is increased, and these piezo-resistors are formed on the outer side of the X-axis piezo-resistors 15-1a and 15-1b (15-2a and 15-2b) stretching (extending) into the frame section 11 or the weight section 13.

In both FIG. 2A and FIG. 2B, the X-axis piezo-resistors 15-1a and 15-1b (15-2a and 15-2b) having the length L1 are disposed in a portion where the distortion is the largest. Thus, the Z-axis piezo-resistors 15-5a and 15-5b (15-6a and 15-6b) having a length longer than the length L1 contain inevitably a less-distortion area, and sensitivity of the Z-axis piezo-resistors naturally drops.

The following advantages are achieved in Embodiment 1.

(1) The Z-axis piezo-resistors 15-5a, 15-5b, 15-6a and 15-6b of which the length L2 is longer than the length L1 are formed. Sensitivity of the Z-axis piezo-resistors drops since the smaller-distortion portion is naturally included in the Z-axis piezo-resistors. Therefore, the output difference between the X axis and the Z axis can be simply and easily decreased.

(2) Since the length L2 of each Z-axis piezo-resistor 15-5a, 15-5b, 15-6a and 15-6b is longer than the length L1 of each X-axis piezo-resistor 15-1a, 15-1b, 15-2a and 15-2b, the resistance of the Z-axis piezo-resistor is higher than that of the X-axis piezo-resistor. Therefore if the voltage to be applied to the acceleration sensor is fixed to 2V, for example, the current that flows into the Z-axis piezo-resistors 15-5a, 15-5b, 15-6a and 15-6b decreases. Accordingly, power consumption can be saved in the Z-axis piezo-resistors and the power consumption of the entire acceleration sensor can be simply and easily decreased.

Embodiment 2

Figure 3A:
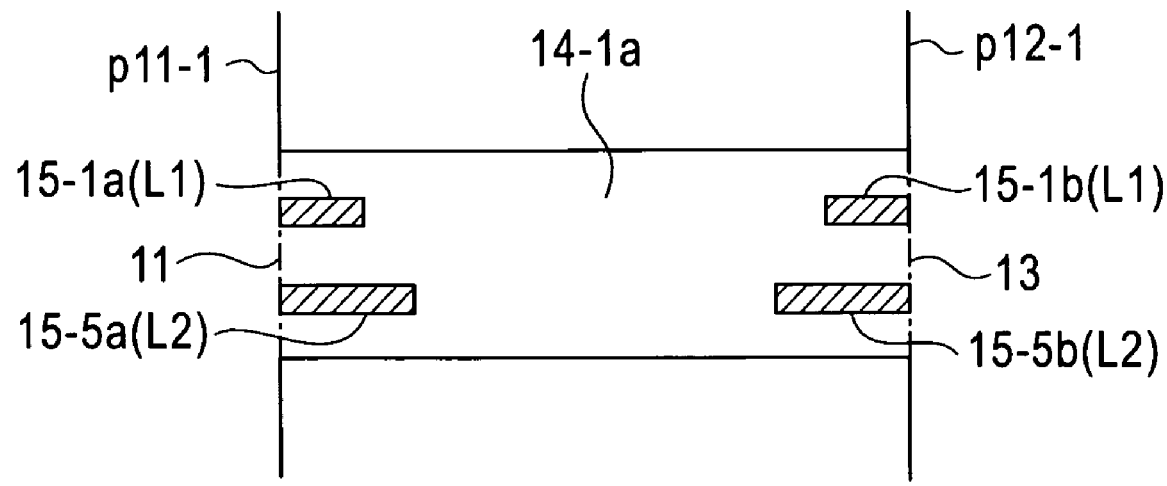
FIG. 3A is an enlarged plan view depicting positions and shapes of the piezo-resistors in FIG. 1A according to a second embodiment of the present invention.
Figure 3B:
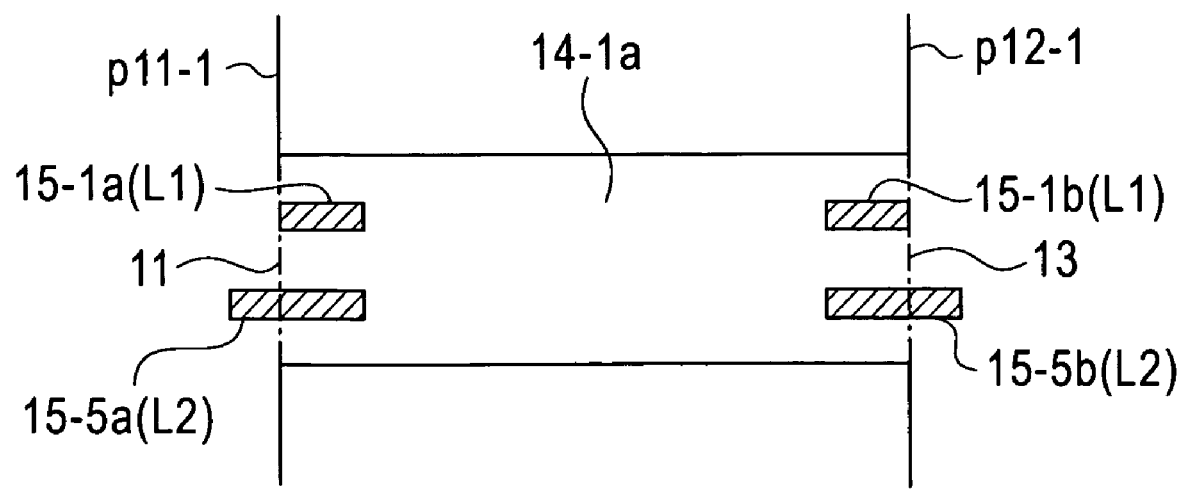
FIG. 3B is similar to FIG. 3A and shows another positions and shapes of the piezo-resistors according to the second embodiment of the present invention.
Figure 4A:
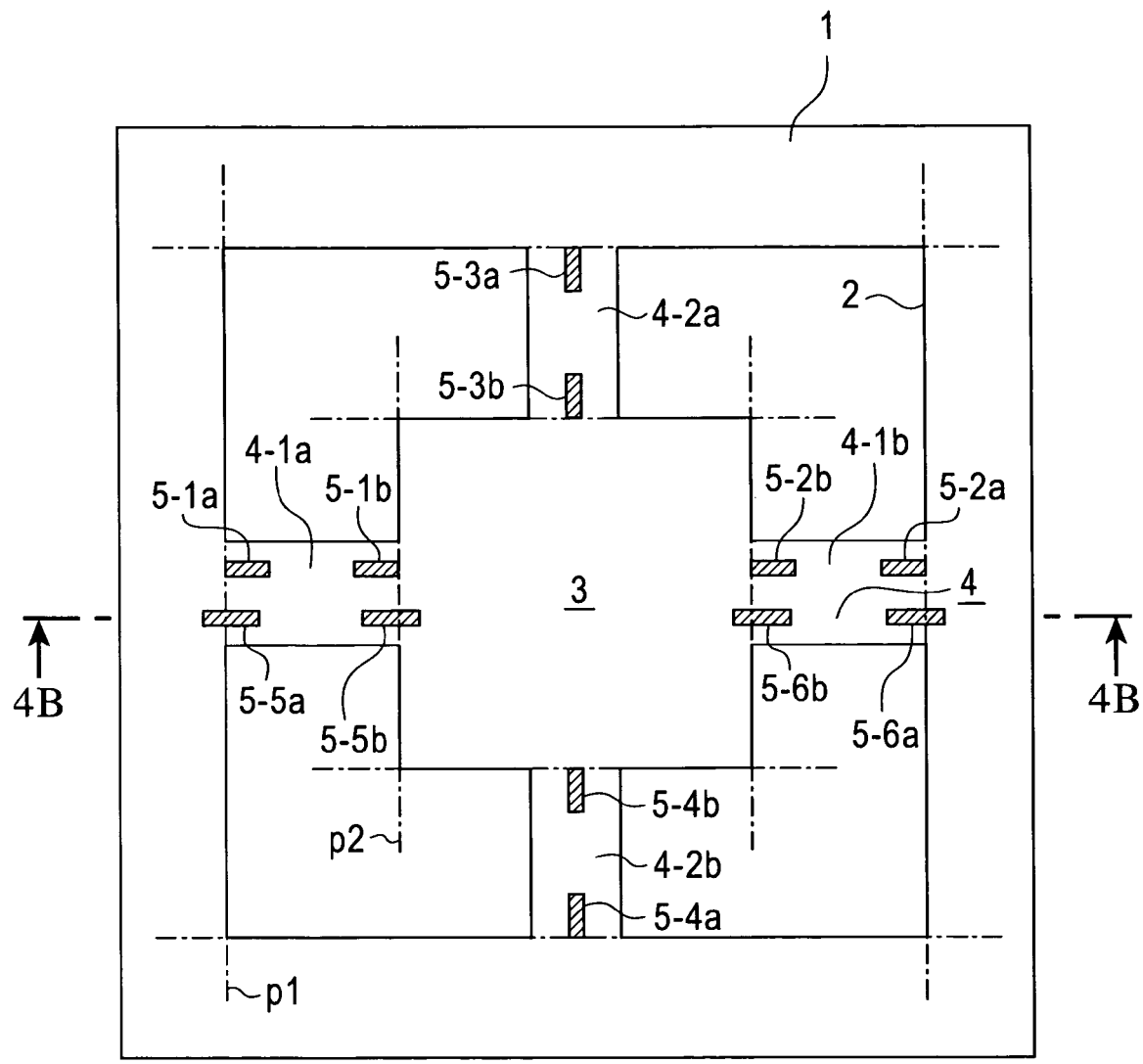
FIG. 4A is a plan view showing a general configuration of a conventional piezo-resistance type triaxial acceleration sensor.
Figure 4B:
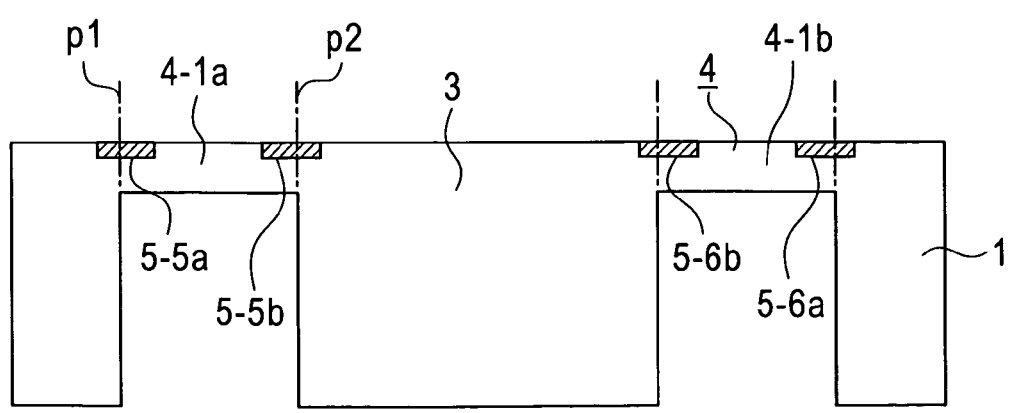
FIG. 4B is a cross-sectional view taken along the line 4B-4B in FIG. 4A.

FIG. 3A and FIG. 3B are enlarged plan views depicting Embodiment 2 of the present invention. FIG. 3A and FIG. 3B are similar to FIG. 2A and FIG. 2B, and illustrate the formation locations and shapes (particularly the lengths L1 and L2) of the piezo-resistors 15-1a, 15-1b to 15-6a, 15-6b which are formed on the beam elements 14-1a, 14-1b, 14-2a and 14-2b shown in FIG. 1A. In FIG. 3A, only the beam element 14-1a is shown to simplify the illustration.

The primary feature of the present invention lies in that the length L2 of the Z-axis piezo-resistors 15-5a, 15-5b, 15-6a and 15-6b is longer than the length L1 of the X-axis piezo-resistors 15-1a, 15-1b, 15-2a and 15-2b so as to drop the sensitivity of the Z-axis piezo-resistors. In Embodiment 2, each Z-axis piezo-resistor 15-5a, 15-5b, 15-6a and 15-6b includes the length L1 of the corresponding X-axis piezo-resistor 15-1a, 15-1b, 15-2a and 15-2b entirely and also includes a smaller-distortion area, to drop the sensitivity.

In FIG. 3A and FIG. 3B, like FIG. 2A and FIG. 2B, the X-axis piezo-resistor 15-1a (15-2a), out of the X-axis piezo-resistors 15-1a and 15-1b (15-2a and 15-2b) having the length L1, is formed at a position contacting the boundary line P11-1 (P11-2) with the frame section 11, and the X-axis piezo-resistor 15-1b (15-2b) is formed at a position contacting the boundary line P12-1 (P12-2) with the weight section 13.

In FIG. 3A, the Z-axis piezo-resistor 15-5a (15-6a), out of the Z-axis piezo-resistors 15-5a and 15-5b (15-6a and 15-6b) having the length L2, is formed at a position contacting the boundary line P11-1 (P11-2) with the frame section 11, and the Z-axis piezo-resistor 15-5b (15-6b) is formed at a position contacting the boundary line P12-1 (P12-2) with the weight section 13. The length L2 of the Z-axis piezo-resistors 15-5a and 15-5b (15-6a and 15-6b) is simple extension of the length L1. In other words, the Z-axis piezo-resistors extend in exactly the same area (length L1 area) as the corresponding X-axis piezo-resistors (i.e., the maximum distortion portions), and also extend in additional areas so as to drop the sensitivity.

In FIG. 3B, the Z-axis piezo-resistors 15-5a and 15-5b (15-6a and 15-6b) extends in exactly the same area (length L1 area) as the corresponding X-axis piezo-resistors 15-1a and 15-1b (15-2a, 15-2b) and also extend into the frame section 11 or the weight section 13. The Z-axis piezo-resistors contain less-distortion portions to reduce the sensitivity.

Embodiment 2 has the following advantage in addition to the power saving effect.

The length L2 of the Z-axis piezo-resistors 15-5a, 15-5b, 15-6a and 15-6b includes the length L1 entirely. In general, the value of the length L1 is already known. Thus, calculation of the length L2 is easy. In the case of Japanese Patent Application Kokai No. 2003-279592, the piezo-resistors have the same shape and only positions thereof are different, so the calculation of the distortion quantity to determine the positions is complicated. This problem is solved by Embodiment 2.

Embodiment 3

The present invention is not limited to the above described and illustrated embodiments, and can be modified in various ways. One example of such modifications will be described as Embodiment 3.

The shape of the acceleration sensor 10 is not limited to a square. A rectangle or a circle is acceptable. The shapes and the numbers of the weight section 13, the beam elements 14 which support the weight section 13, and the piezo-resistors 15-1a, 15-1b to 15-6a, 15-6b formed on the beam elements are also not limited to the above-described or illustrated shapes and numbers.

This application is based on a Japanese Patent Application No. 2004-372370 filed on Dec. 22, 2004 and the entire disclosure thereof is incorporated herein by reference.

What is claimed is:

1. An acceleration sensor, comprising:
a frame section having an X axis, a Y axis and a Z axis of a three-dimensional coordinate system;
a mass section disposed inside the frame section;
a beam section including a plurality of X-direction beam elements extending in an X axis direction and a plurality of Y-direction beam elements extending in a Y axis direction, for flexibly connecting the mass section to the frame section by the plurality of X-direction beam elements and the plurality of Y-direction beam elements;
a plurality of X-axis piezo-resistor pairs associated with the plurality of X-direction beam elements, respectively, each said X-axis piezo-resistor pair including a first X-axis piezo-resistor with a first length disposed in contact with one end of the associated X-direction beam element, and a second X-axis piezo-resistor with the first length disposed in contact with the other end of the associated X-direction beam element;
a plurality of Y-axis piezo-resistor pairs associated with the plurality of Y-direction beam elements, respectively, each said Y-axis piezo-resistor pair including a first Y-axis piezo-resistor with the first length disposed in contact with one end of the associated Y-direction beam element, and a second Y-axis piezo-resistor with the first length disposed in contact with the other end of the associated Y-direction beam element; and
a plurality of Z-axis piezo-resistor pairs associated with the plurality of X-axis piezo-resistor pairs, respectively, each said Z-axis piezo-resistor pair including a first Z-axis piezo-resistor with a second length disposed in the vicinity of the first X-axis piezo-resistor of the associated X-axis piezo-resistor pair, and a second Z-axis piezo-resistor with the second length disposed in the vicinity of the second X-axis piezo-resistor of the associated X-axis piezo-resistor pair, the second length being greater than the first length.

2. The acceleration sensor according to claim 1, wherein the first and second Z-axis piezo-resistors of each said Z-axis piezo-resistor pair extend within the associated X-direction beam element.

3. The acceleration sensor according to claim 1, wherein the first Z-axis piezo-resistor of each said Z-axis piezo-resistor pair extends in the associated X-direction beam element and also in the frame section.

4. The acceleration sensor according to claim 1, wherein the second Z-axis piezo-resistor of each said Z-axis piezo-resistor pair extends in the associated X-direction beam element and also in the mass section.

5. The acceleration sensor according to claim 1, wherein each said first and second X-axis piezo-resistors extend in areas of largest distortion of the associated X-direction beam element.

6. The acceleration sensor according to claim 1, wherein the first length is about 50 μm and the second length is about 60-70 μm.

7. The acceleration sensor according to claim 1, wherein a thickness of the substrate is 625 μm or 525 μm.

8. An acceleration sensor, comprising:

a frame section having an X axis, a Y axis and a Z axis of a three-dimensional coordinate system;

a mass section disposed inside the frame section;

a beam section including a plurality of X-direction beam elements extending in an X axis direction and a plurality of Y-direction beam elements extending in a Y axis direction, for flexibly connecting the mass section to the frame section by the plurality of X-direction beam elements and the plurality of Y-direction beam elements;

a plurality of X-axis piezo-resistor pairs associated with the plurality of X-direction beam elements, respectively, each said X-axis piezo-resistor pair including a first X-axis piezo-resistor with a first length disposed in contact with one end of the associated X-direction beam element, and a second X-axis piezo-resistor with the first length disposed in contact with the other end of the associated X-direction beam element;

a plurality of Y-axis piezo-resistor pairs associated with the plurality of Y-direction beam elements, respectively, each said Y-axis piezo-resistor pair including a first Y-axis piezo-resistor with the first length disposed in contact with one end of the associated Y-direction beam element and a second Y-axis piezo-resistor with the first length disposed in contact with the other end of the associated Y-direction beam element; and a plurality of Z-axis piezo-resistor pairs associated with the plurality of X-axis piezo-resistor pairs, respectively, each said Z-axis piezo-resistor pair including a first Z-axis piezo-resistor with a second length disposed in the vicinity of the first X-axis piezo-resistor of the associated X-axis piezo-resistor pair, and a second Z-axis piezo-resistor with the second length disposed in the vicinity of the second X-axis piezo-resistor of the associated X-axis piezo-resistor pair, wherein said first Z-axis piezo-resistor of each said Z-axis piezo-resistor pair extends in exactly the same area as the first X-axis piezo-resistor of the associated X-axis piezo-resistor pair, and also extends in an area of smaller distortion so that the first Z-axis piezo-resistor is longer than the first X-axis piezo-resistor, and the second Z-axis piezo-resistor of each said Z-axis piezo-resistor pair extends in exactly the same area as the second X-axis piezo-resistor of the associated X-axis piezo-resistor pair and also extends in an area of smaller distortion so that the second Z-axis piezo-resistor is longer than the second X-axis piezo-resistor.

9. The acceleration sensor according to claim 8, wherein the first and second Z-axis piezo-resistors of each said Z-axis piezo-resistor pair extend within the associated X-direction beam element.

10. The acceleration sensor according to claim 8, wherein the first Z-axis piezo-resistor of each said Z-axis piezo-resistor pair extends in the associated X-direction beam element and also in the frame section.

11. The acceleration sensor according to claim 8, wherein the second Z-axis piezo-resistor of each said Z-axis piezo-resistor pair extends in the associated X-direction beam element and in also the mass section.

12. The acceleration sensor according to claim 8, wherein each said first and second X-axis piezo-resistors extend in areas of largest distortion of the associated X-direction beam element.

13. The acceleration sensor according to claim 8, wherein the first length is about 50 μm and the second length is about 60-70 μm.

14. The acceleration sensor according to claim 8, wherein a thickness of the substrate is 625 μm or 525 μm.

* * * * *